(12) United States Patent
Sall

(10) Patent No.: US 6,859,219 B1
(45) Date of Patent: Feb. 22, 2005

(54) METHOD AND APPARATUS HAVING MULTIPLE DISPLAY DEVICES

(75) Inventor: Susan R. Sall, Sioux City, IA (US)

(73) Assignee: Gateway, Inc., Irvine, CA (US)

(*) Notice: Subject to any disclaimer, the term of this patent is extended or adjusted under 35 U.S.C. 154(b) by 0 days.

(21) Appl. No.: 09/416,516

(22) Filed: Oct. 8, 1999

(51) Int. Cl.[7] ............................................. G09G 5/00
(52) U.S. Cl. .................. 345/905; 345/1.1; 345/1.2; 345/1.3; 345/902; 345/903; 715/764; 715/779; 715/788
(58) Field of Search ..................... 345/1.1, 1.2, 1.3, 345/169, 901–903, 905, 1, 4; 715/764, 778, 779, 788; 361/681; 403/76

(56) References Cited

U.S. PATENT DOCUMENTS

| | | | |
|---|---|---|---|
| 5,030,128 A | 7/1991 | Herron et al. | 439/372 |
| 5,128,662 A | 7/1992 | Failla | 340/752 |
| 5,465,315 A | 11/1995 | Sakai et al. | 385/116 |
| 5,629,833 A | 5/1997 | Ido et al. | 361/681 |
| 5,682,529 A * | 10/1997 | Hendry et al. | 345/4 |
| 5,768,096 A | 6/1998 | Williams et al. | 361/681 |
| 5,790,371 A | 8/1998 | Latocha et al. | 361/683 |
| 5,900,848 A * | 5/1999 | Haneda et al. | 345/1 |
| 5,923,307 A * | 7/1999 | Hogle, IV | 345/4 |
| 5,949,643 A * | 9/1999 | Batio | 362/681 |
| 5,990,021 A * | 11/1999 | Prall et al. | 361/681 |
| 6,222,507 B1 * | 4/2001 | Gouko | 345/1 |
| 6,295,038 B1 * | 9/2001 | Rebeske | 345/1 |
| 6,302,612 B1 * | 10/2001 | Fowler et al. | 403/76 |
| 2001/0054986 A1 * | 12/2001 | Leman | 345/1.1 |

* cited by examiner

Primary Examiner—Bipin Shalwala
Assistant Examiner—David L. Lewis
(74) Attorney, Agent, or Firm—Stites & Harbison PLLC; Ross Hunt, Jr.

(57) ABSTRACT

Apparatuses, systems and methods for multiple display devices are described. A display apparatus includes a primary display device for a computer. The display apparatus also includes at least one secondary display device for the computer with the at least one secondary display device being operatively coupled to the primary display device. Moreover, the at least one secondary display device is stored in a housing behind the primary display device, such that the at least one secondary display device can be extended from the housing and used to display information for the computer.

41 Claims, 13 Drawing Sheets

METHOD AND APPARATUS HAVING MULTIPLE DISPLAY DEVICES

FIELD OF THE INVENTION

The present invention relates generally to a system having multiple display devices, and more specifically to a system having multiple display devices in a single housing.

BACKGROUND OF THE INVENTION

Currently, in the software industry one of the big concerns is the most efficient use of the display area that is available on a particular system. One example illustrated in many of the software applications being currently produced is seen in the changing relationship of the tertiary (i.e., secondary) areas (e.g., tools bars and buttons) for a particular application in comparison to the actual primary (e.g., viewable) area for the application. In particular, the relationship is changing such that the goal is to reduce the size of these tertiary areas while increasing the size of the primary area. For example, in a word processing application such as Microsoft® Word, the goal would be to reduce the tool bar and button areas (i.e. the secondary area) and increase the window in which the document is being edited (i.e., the primary area). Logically, a general increase in the size of the overall display area also helps to achieve this goal of increasing the viewing of the primary area for a particular software application.

However, certain circumstances do not lend themselves to allowing an increase in the overall display area. For example, an individual using a laptop computer on an airplane would probably be unable to have a large display area for the computer due to space constraints associated with an airplane. Accordingly, there needs to be a compromise for maximizing display area at appropriate times of computer use.

Currently, there are notebook computers with multiple display screens. Disadvantageously, these notebook computers have a limited number of display screens or the storage of these screens are such that the screens must be stored separate from the computer. Accordingly, it would be desirable to improve the current apparatuses, systems and methods of multiple display devices.

SUMMARY OF THE INVENTION

The above-mentioned shortcomings, disadvantages and problems are addressed by embodiments of the present invention, which will be understood by reading and studying the following specification. The invention describes apparatuses, systems and methods for multiple display devices. In one embodiment, a display apparatus includes a primary display device for a computer. The display apparatus also includes at least one secondary display device for the computer with the at least one secondary display device being operatively coupled to the primary display device. Moreover, the at least one secondary display device is stored in a housing behind the primary display device, such that the at least one secondary display device can be extended from the housing and used to display information for the computer.

In another embodiment, the at least one secondary display device is held in an extended position with a spring loaded switch when the at least one secondary display device is extended from the housing. In yet another embodiment, the spring loaded switch provides for a transmission of a reconfiguration signal to the computer when the at least one secondary display device is extended from the housing. In still another embodiment, the at least one secondary display device is operatively coupled to the computer through a flat printed cable (FPC). In one embodiment, the at least one secondary display device and the primary display device are operatively coupled to the computer through a single inverter board. Still other and further aspects and embodiments of the present invention will become apparent by reference to the drawings and by reading the following detailed description.

DESCRIPTION OF EMBODIMENTS

The invention embodiments include systems, apparatuses and methods of varying scope. In addition to the embodiments, advantages and aspects of the invention described here, the invention also includes other embodiments, advantages and aspects, as will become apparent by reading and studying the drawings and the following description. In the following description of the exemplary embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

Figure 1:
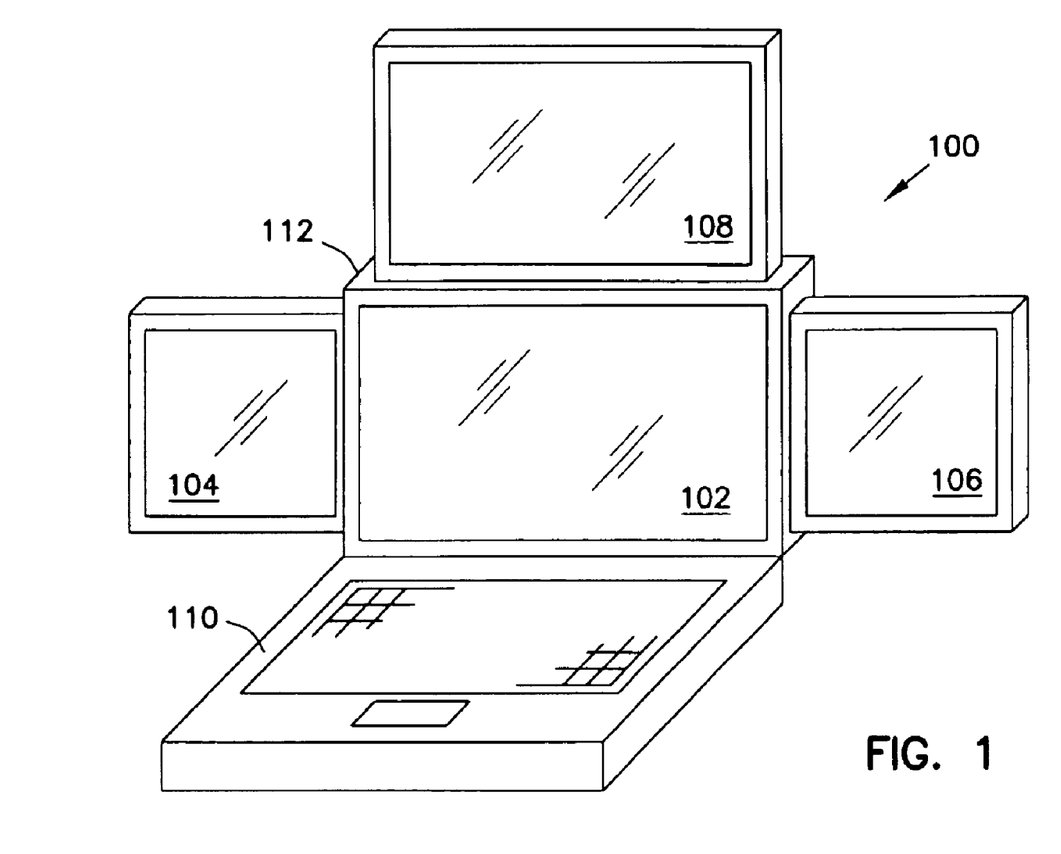
FIG. 1 is a perspective view of an apparatus embodiment for multiple display devices.

Apparatus 100 of one embodiment for multiple display devices is described with reference to FIG. 1. In particular, FIG. 1 includes primary display device 102, secondary display device 104, secondary display device 106, secondary display device 108, computer 110 and housing 112. This embodiment of computer 110 is a portable computer; however, the invention is not so limited, as additional embodiments for multiple display screens can be included or embodied into any other type of system involving display devices (e.g., a desktop computer, a laptop computer and the like). Moreover, FIG. 1 illustrates three secondary display devices; however, the invention is not so limited as embodiments of the invention anticipate fewer than and/or more than three secondary display devices.

In one embodiment, at least one of primary display device 102, secondary display device 104, secondary display device 106 and secondary display device 108 is a liquid crystal display (LCD) screen. In another embodiment, secondary display device 104, secondary display device 106 and secondary display device 108 are stored in housing 112 behind primary display device 102.

Figure 2:
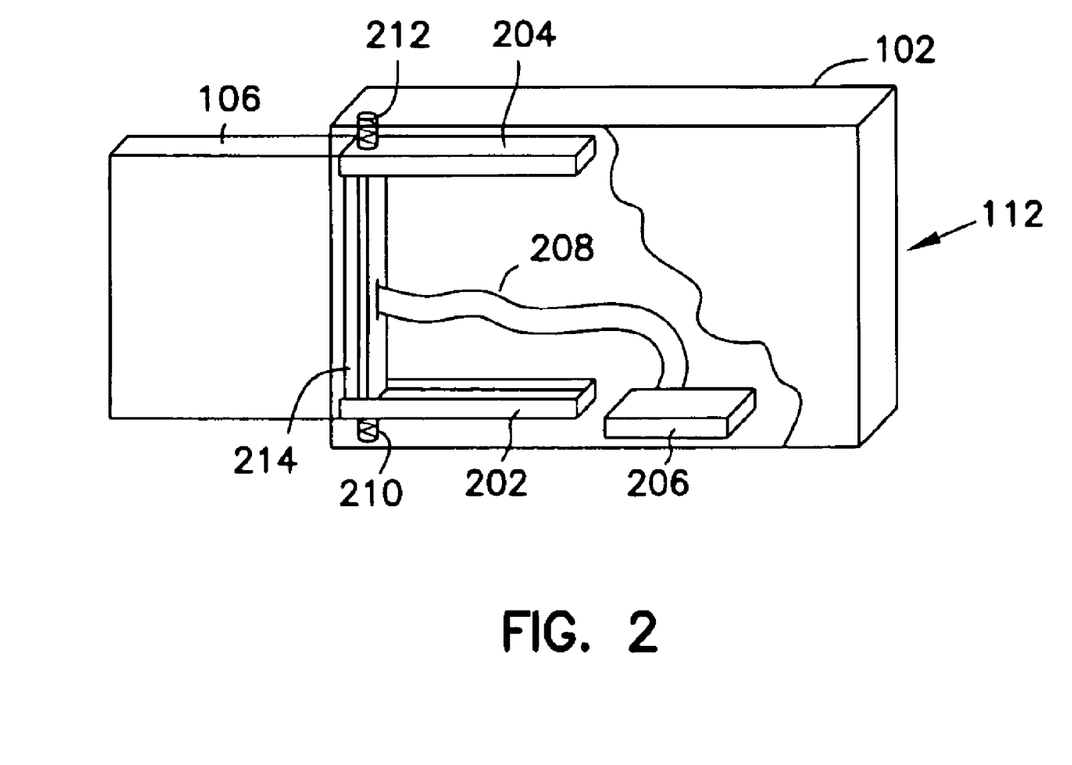
FIG. 2 is an internal view of a housing of the apparatus of FIG. 1.

In another embodiment, housing 112 wherein the secondary display devices are stored behind primary display device 102 is illustrated in FIG. 2. In reference to FIG. 1, FIG. 2 illustrates a cutaway backside view of the apparatus of FIG. 1. In particular, FIG. 2 includes primary display device 102, secondary display device 106, housing 112, track 202, track 204, flat printed cable (FPC) 208, inverter board 206, spring loaded switch 210, spring loaded switch 212 and stabilizing band 214. FIG. 2 is limited to a single secondary display device for purposes of clarity only. However, it is anticipated that in alternative embodiments multiple secondary display devices can be stored with a same housing behind the primary display device; especially in view of the ever-decreasing size of the widths of display devices (e.g., LCD screens). Housing 112 includes tracks 202 and 204 such that secondary display device 106 is stored in and extended beside housing 112 while engaged with such tracks. In particular, FIG. 2 illustrates secondary display device 106 in an extended position.

Housing 112 also includes spring loaded switches 210 and 212 which as illustrated lay along tracks 202 and 204, respectively. In one embodiment, spring loaded switches 210 and 212 hold secondary display device 106 in the extended position, shown in FIG. 2. Advantageously, these switches lock the secondary display devices in place to preclude them from sliding back into housing 112 until such time that the user of computer 110 pushes the secondary display devices back into storage in housing 112. Such locking may be accomplished in numerous ways, including but not limited to engaging slots or receptacles in the secondary display devices.

Moreover in another embodiment, spring loaded switches 210 and 212 serve in another capacity. In this embodiment, spring loaded switches 210 and 212 are operatively and electrically coupled to computer 110 so as to allow the transmission of electrical signals between the two. In one such embodiment, when secondary display device 106 is in an extended position, spring loaded switches 210 and 212 complete a connection to cause an electrical signal to be transmitted back to a pin of a hardware controller of computer 110. In one embodiment, the hardware controller is a video controller of computer 110. In another embodiment, the electrical coupling between spring loaded switches 210 and 212 to computer 110 is through a loop back configuration. Upon receiving this electrical signal at the connecting pin, the hardware controller generates an interrupt causing firmware on the controller to force a reconfiguration of computer 110. Advantageously, when this electrical signal is received by computer 110, computer 110 can reconfigure both its hardware and software systems along with primary display device 102 and the secondary display devices to allow for viewing across multiple display devices.

Figure 3:
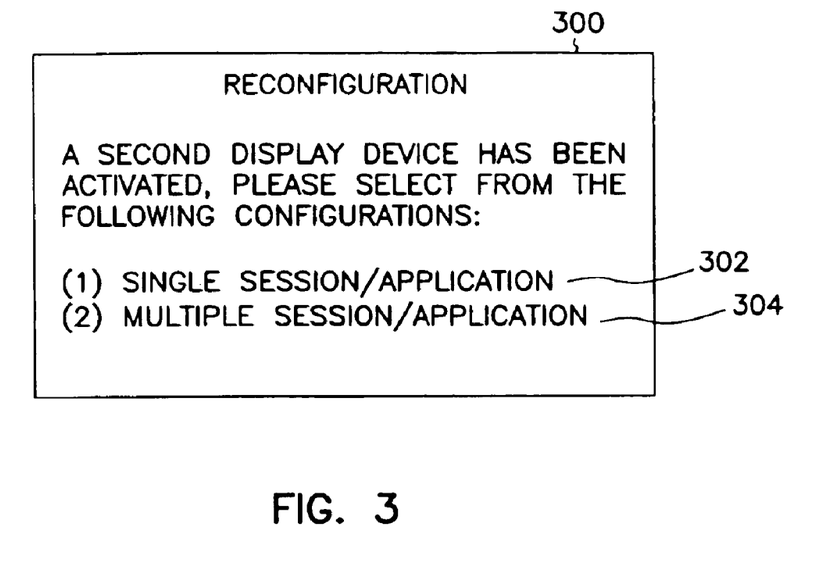
FIG. 3 is an embodiment of a reconfiguration screen used in conjunction with embodiments of the present invention.

In one such embodiment, computer 110 automatically reconfigures its software and hardware systems and the display devices without restarting (i.e., rebooting). In a further embodiment, computer 110 allows the computer user to decide how the system and display devices are to be configured. For example, this may be done by offering a menu on the display for choosing the desired configuration; one embodiment of which is illustrated in FIG. 3. In particular, FIG. 3 includes reconfiguration screen 300 which is comprised of option 302 and option 304. If selected, option 302 configures computer 110 and the display devices to provide single session/application support across multiple display devices. For example, if the computer user wanted to increase the viewing size of a word processing application such that a legal size and/or A4 size paper could be viewed at one time, the individual could pull a secondary display device from the top of the housing of the primary display device and select option 302. Accordingly, this would allow the computer user to increase the portrait-viewing area for a particular application and therefore could allow the computer user to view legal size and/or A4 size paper at one time across the multiple display devices. Similarly in other embodiments, secondary display devices could be extended from the side of the housing of the primary display device to increase the landscape view area when necessary.

If selected, option 304 of FIG. 3 configures computer 110 and display devices to provide multiple session/application support across multiple display devices. In one embodiment if option 304 is selected, additional reconfiguration screens would be displayed to allow the computer user to select which display devices will display which session/application. For example, if a computer user is running a CAD (Computer Aided Design) application, the individual could display the 2-D (two-dimensional) model in one display device, the 3-D (three-dimensional) model in a second display device and the tools and buttons for the CAD application in a third display device. Advantageously, this type of set-up would allow the computer user to view different portions of the CAD application at one moment in time. In other words, the computer user would not be required to make a choice between which screen is to be viewed at the expense of being unable to view another. Moreover, additional reconfiguration options and screens to allow for other reconfiguration of the display devices are also within the scope of the invention. For example, additional reconfiguration options could be included in reconfiguration screen 300 of FIG. 3, such as a reconfiguration option that allows the computer user to configure computer 110 to display one image across two display devices, while displaying a second image on a third display device.

Embodiments of the reconfiguration screen of FIG. 3 can be realized at least in part as one or more programs running on a computer—that is, as a program executed from a computer-readable medium such as a memory by a processor of a computer. The programs are desirably storable on a computer-readable medium such as a floppy disk, a Compact Disk-Read Only Memory (CD-ROM), for distribution and installation and execution on another (suitably equipped) computer.

In another embodiment, secondary display device 106 is operatively coupled to computer 110 through FPC 208. FPC 208 is a flat printed cable such as the type used for the scanner devices of copiers or used in conjunction with the connection between a computer and the primary display device for a notebook computer. Connection of secondary display devices using a flat printed cable provides the advantage of allowing the secondary display devices to move along the tracks of the housing from the stored and extended positions. In one embodiment, secondary display device 106 and primary display device 104 are both operatively coupled to computer 110 through inverter board 206. Inverter board 206 is an inverter board used in conjunction with the connection of display devices with the associated systems, as is well known in the art.

In one such embodiment, inverter board 206 is used by all display devices connecting to computer 110. One embodiment wherein FPCs connect the various display devices to computer 110 through inverter board is illustrated in FIG. 4A.

Figure 4A:
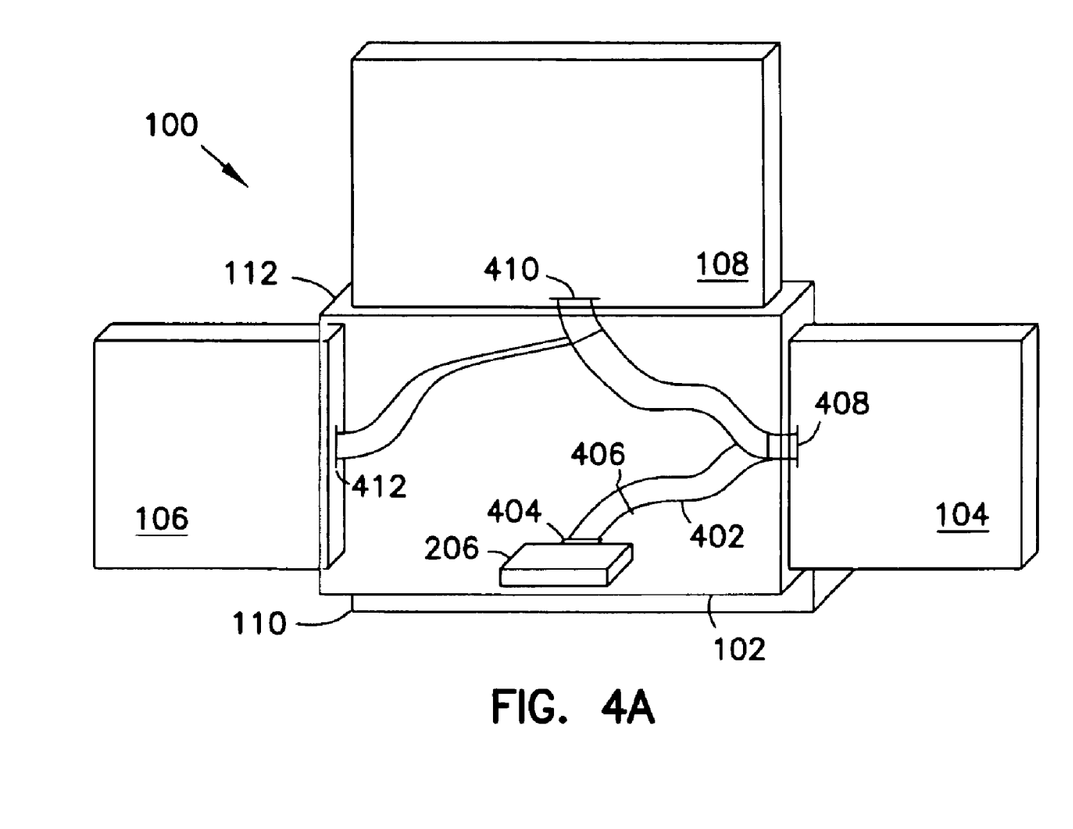
FIG. 4A is an embodiment of the apparatus of FIG. 1 illustrating one embodiment of a connection configuration between a computer and the various display devices.

In reference to FIG. 1, FIG. 4A illustrates a cutaway backside view of an embodiment of apparatus 100 of FIG. 1. In particular, FIG. 4A illustrates a FPC tree design used in connecting one FPC having multiple connectors connecting to the multiple display devices, and the FPC, in turn, is connected by one connector into the inverter board residing in the housing of the primary display device. FIG. 4A is an embodiment of apparatus 100. Apparatus 100 in this embodiment includes primary display device 102, secondary display device 104, secondary display device 106, secondary display device 108, computer 110, housing 112, inverter board 206, FPC 402, connector 404, connector 406, connector 408, connector 410 and connector 412.

Connectors 404–412 are standard multi-socket/multi-pin connectors used in connected flat printed cables to hardware devices, as is well known in the art. In particular, inverter board 206 is connected to FPC 402 through connector 404. Additionally, primary display device 102 is connected to FPC 402 through connector 406, and secondary display device 104 is connected to FPC 402 through connector 408. Similarly, secondary display device 108 is connected to FPC 402 through connector 410, and secondary display device 106 is connected to FPC 402 through connector 412. Advantageously, this configuration allows the use of a single inverter board as well as a single FPC to connect the multiple display devices to the associated computer.

Figure 4B:
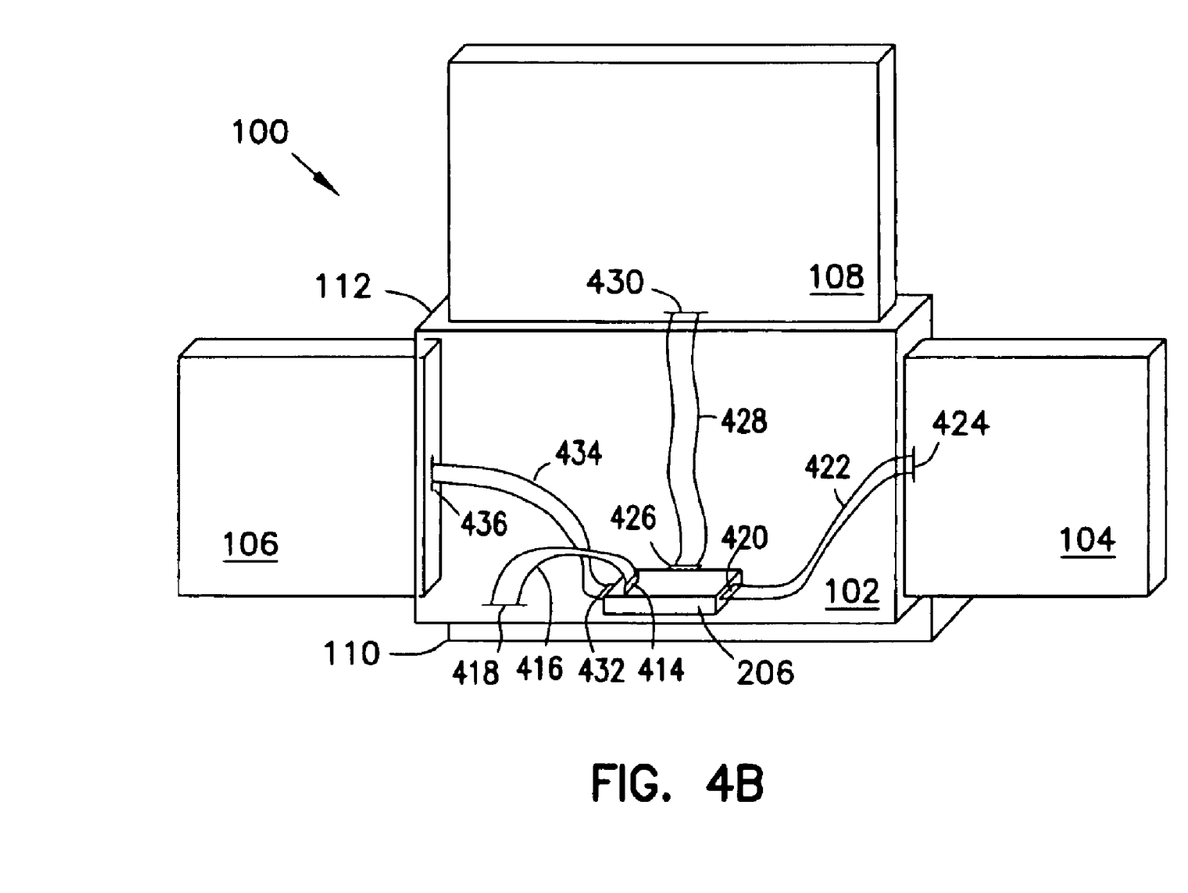
FIG. 4B is another embodiment of the apparatus of FIG. 1 illustrating an alternative embodiment of a connection configuration between a computer and the various display devices.

An alternative embodiment wherein FPCs connect the various display devices to computer 110 through inverter board 206 is illustrated in FIG. 4B. In reference to FIG. 1, FIG. 4B illustrates a cutaway backside view of an embodiment of apparatus 100 of FIG. 1. In FIG. 4B, multiple FPCs connect the various display devices to computer 110, such that a one-to-one relationship is established between the number of FPCs and the number of display devices. In other words for each display device, one FPC along with its associated connector is connected to one connector of the inverter board. In particular, FIG. 4B is another embodiment of apparatus 100. Apparatus 100 in this embodiment includes primary display device 102, secondary display device 104, secondary display device 106, secondary display device 108, computer 110, housing 112, inverter board 206, connector 414, FPC 416, connector 418, connector 420, FPC 422, connector 424, connector 426, FPC 428, connector 430, connector 432, FPC 434 and connector 436.

Similar to connectors 404–412, connector 420, connector 424, connector 426, connector 430, connector 432 and connector 436 are standard multi-socket/multi-pin connectors used in connected flat printed cables to hardware devices, as is well known in the art. In particular, inverter board 206 having connector 414 is connected to primary display device 102 having connector 418 through FPC 416 using connector 414 and connector 418. Similarly, inverter board 206 having connector 420 is connected to secondary display device 104 having connector 424 through FPC 422 using connector 420 and connector 424. Additionally, inverter board 206 having connector 426 is connected to secondary display device 108 having connector 430 through FPC 428 using connector 426 and connector 430. Inverter board 206 having connector 432 is also connected to secondary display device 106 having connector 436 through FPC 434 using connector 432 and connector 436. Advantageously, this configuration allows the use of a single inverter board to connect the multiple display devices to the associated computer. Typically, an inverter board used in connection with display devices is limited on the distance that the board can transmit signals. Advantageously, the inverter board can be used in the housing of the primary display device in order to have signal output for both the secondary and primary display devices instead of requiring the use of separate video adapter cards or PCMCIA (Personal Computer Memory Card International Association) slots for each secondary display device, as illustrated in the embodiments of FIG. 4A–4B.

In one embodiment illustrated in FIG. 2, secondary display device 106 is stabilized through stabilizing band 214. As shown in FIG. 2, stabilizing band 214 is attached to tracks 202 and 204 to provide support to secondary display device 106. Self-defined, this band stabilizes secondary display devices when such devices are in an extended position. Stabilizing band 214 is not limited to any particular type of material. Moreover, similar stabilizing bands could be used for additional secondary display devices.

Figure 5A:
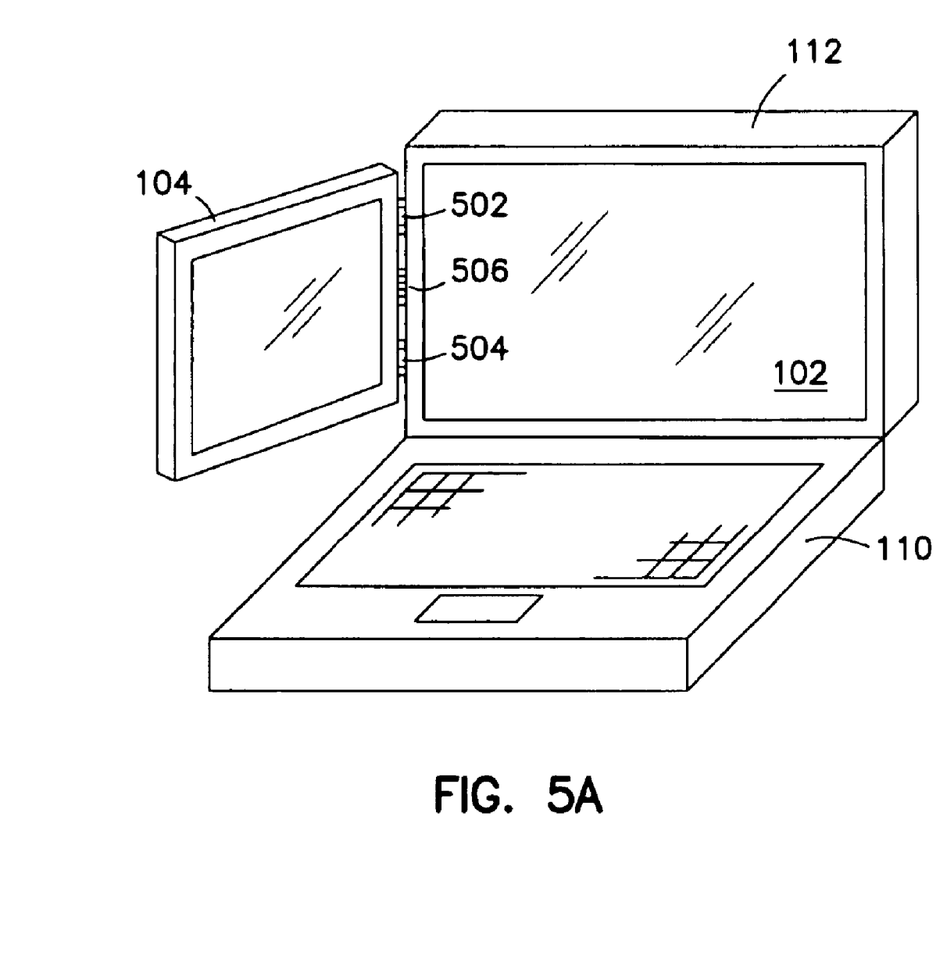
FIG. 5A is a perspective view of another embodiment of the apparatus of FIG. 1.
Figure 5B:
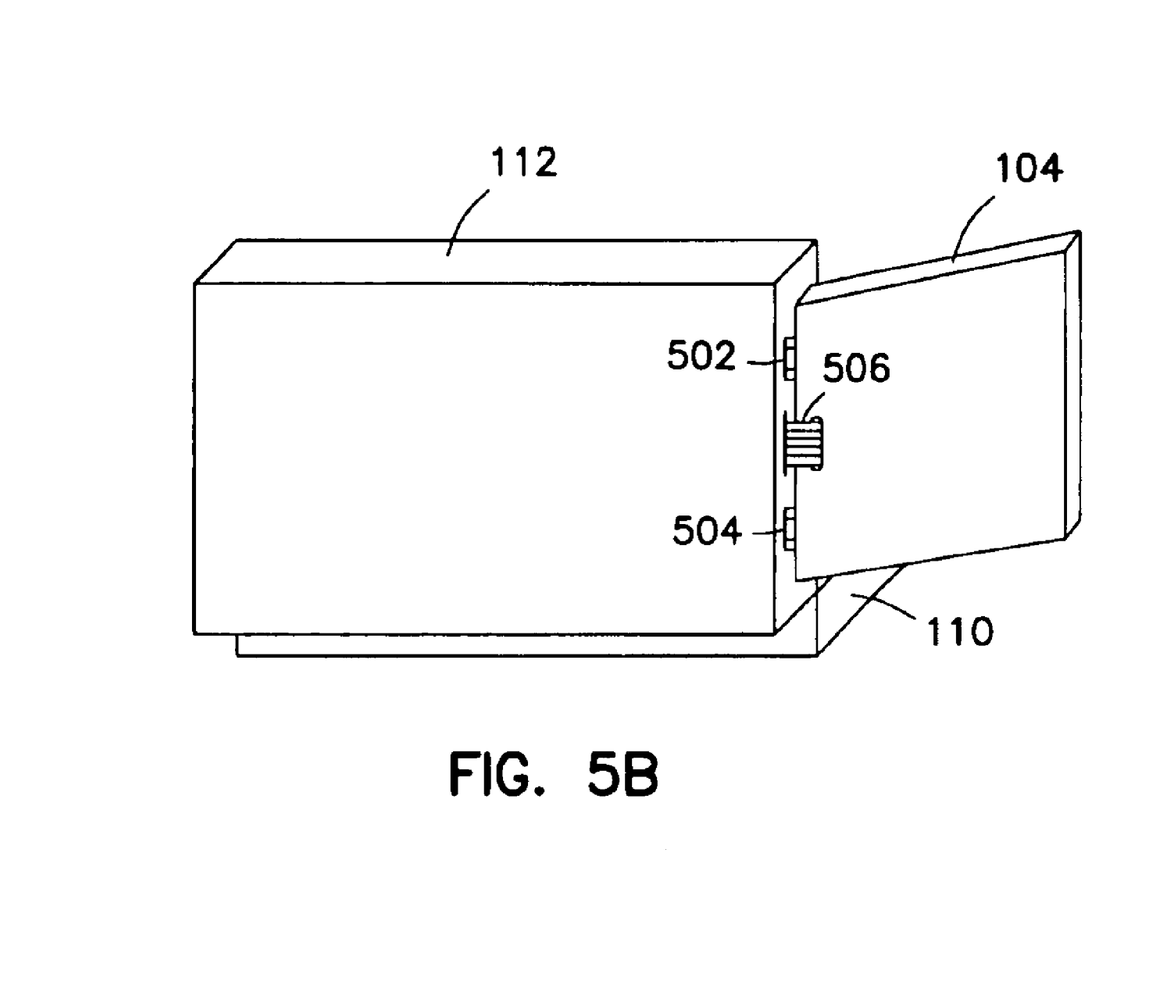
FIG. 5B is a perspective backside view of the apparatus of FIG. 5A.

FIGS. 5A–5B and 6A–6B illustrate additional embodiments of the invention. In particular, FIG. 5A is a perspective view of another embodiment of the apparatus of FIG. 1 and FIG. 5B is a perspective backside view of the apparatus of FIG. 5A. FIGS. 5A–5B includes primary display device 102, computer 110, housing 112, secondary display device 104, hinges 502 and 504 and FPC cable 506. In this embodiment, hinges 502 and 504 are placed on the top and bottom of secondary display device 104, respectively, and connected to housing 112. Advantageously, this allows the secondary display devices to be turned to allow for different viewing angles. For example, if multiple computer users are using computer 110, a secondary display device could be moved to an angle to allow for better viewing of a particular display based on the viewing position of a particular computer user while allowing another computer user from a different viewing position to still view one of the other display devices. FIGS. 5A–5B illustrate the use of two hinges to allow for different viewing angles for the display devices. However, the invention is not so limited, as it is anticipated than more or fewer hinges could be used in connecting secondary display device 104 to housing 112. Such multiple display devices could be positioned in various orientations, as discussed above in conjunction with FIG. 1.

Moreover, the apparatus of FIGS. 5A–5B includes FPC cable 506 that connects primary display device 102 to secondary display device 104. In particular, FPC cable 506 is a flat printed cable, as previously described, that allows for the transmission of data signals as well as power to secondary display device 104. In one embodiment, FPC cable 506 is insulated by surrounding FPC cable 506 with plastic (e.g., plastic tubing).

Figure 6A:
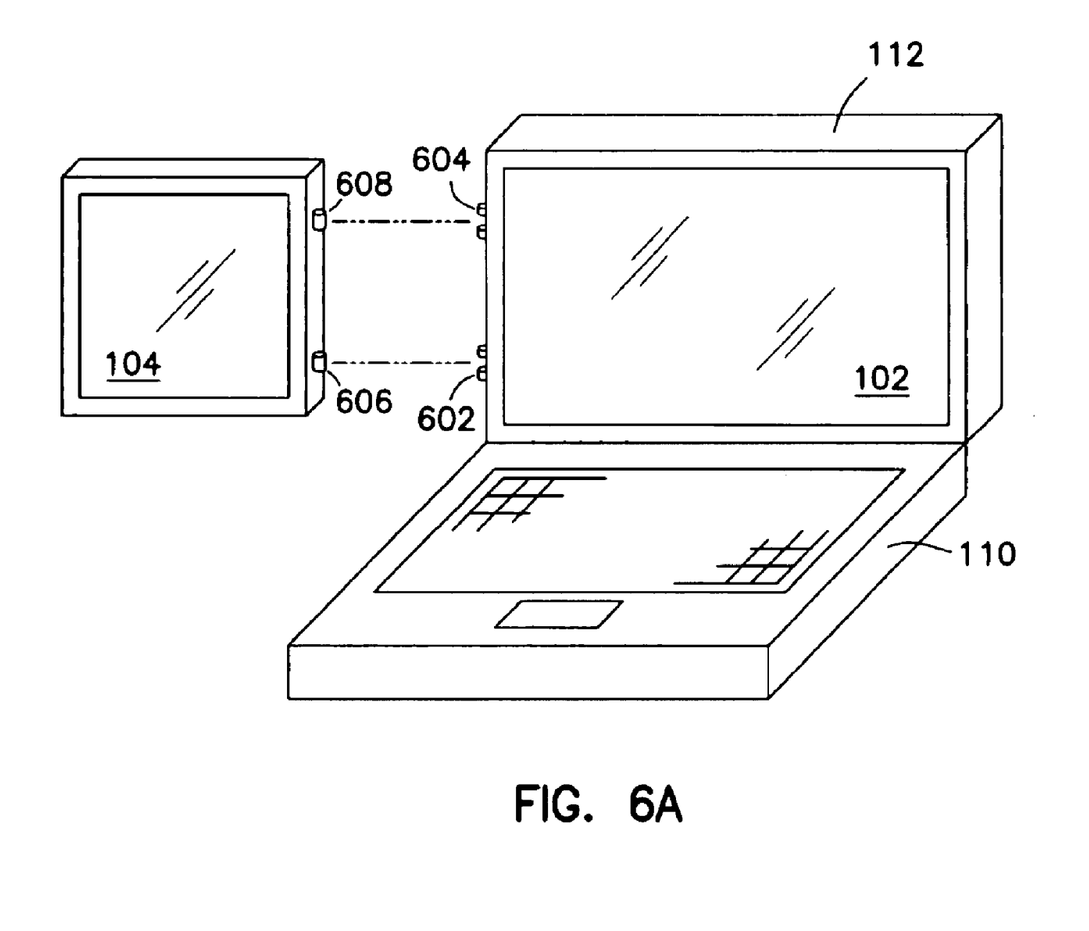
FIG. 6A is one embodiment of the hinges of the apparatus of FIG. 5A–5B.
Figure 6B:
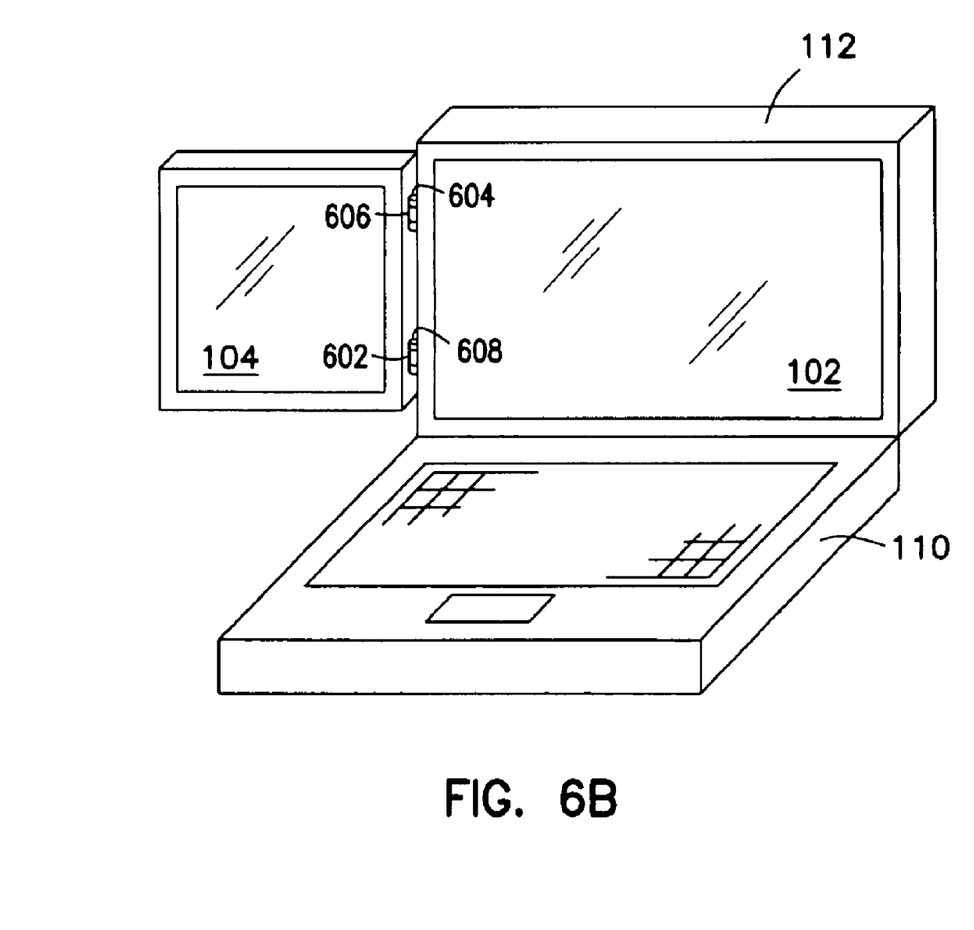
FIG. 6B is another view of the embodiment of the hinges of FIG. 6A.

In one such embodiment illustrated in FIGS. 6A–6B, hinges 502 and 504 are configured in two parts, such that a first part is connected to housing 112 and the second part is connected to secondary display device 104 for a particular hinge. In particular, FIGS. 6A–6B include primary display device 102, computer 110, housing 112, secondary display device 104, hinge part 602, hinge part 604, hinge part 606 and hinge part 608. FIG. 6A illustrates secondary display device 104 separated from housing 112 to clarify how hinge parts 602–608 are coupled together when secondary display device 104 is coupled to housing 112 and is in an extended position. In particular, hinge part 602 and hinge part 604 are coupled to housing 112, while hinge part 606 and hinge part 608 are coupled to secondary display device 104. FIG. 6B illustrates secondary display device 104 coupled to housing 112 and in an extended position. In particular, FIG. 6B illustrates how hinge parts 602–608 are coupled together when secondary display device 104 is in an extended position. Hinge part 602 is connected to hinge part 606, while hinge part 604 is connected to hinge part 608. Accordingly, when secondary display device 104 is in an extended position, the two parts of one particular hinge (e.g., hinge part 602 and hinge part 606) are coupled together to allow for the different viewing angles as described above in conjunction with FIG. 5. Moreover, secondary display device 104 is able to move to the stored position in housing 112 along the tracks illustrated in FIG. 2. Additionally, it is anticipated that multiple display devices could be so hinged.

Figure 7:
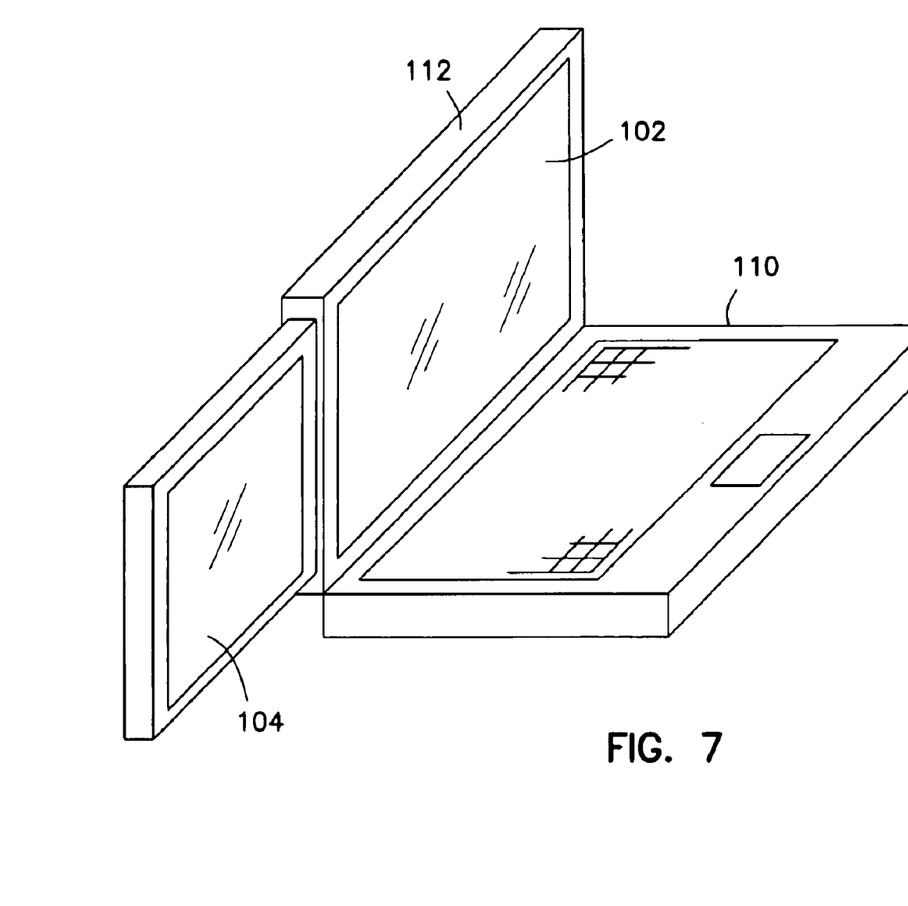
FIG. 7 is a side view of the apparatus of FIG. 1 when a secondary display device is is an extended position.
Figure 8:
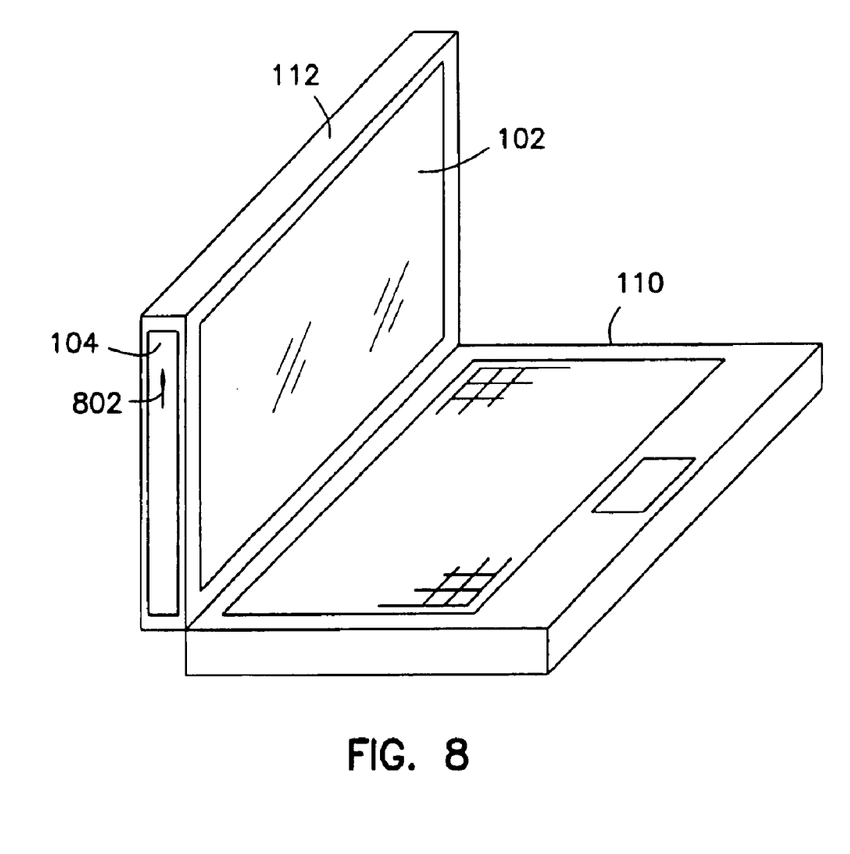
FIG. 8 is a side view of the apparatus of FIG. 1 when a secondary display device is in a stored position.
Figure 9:
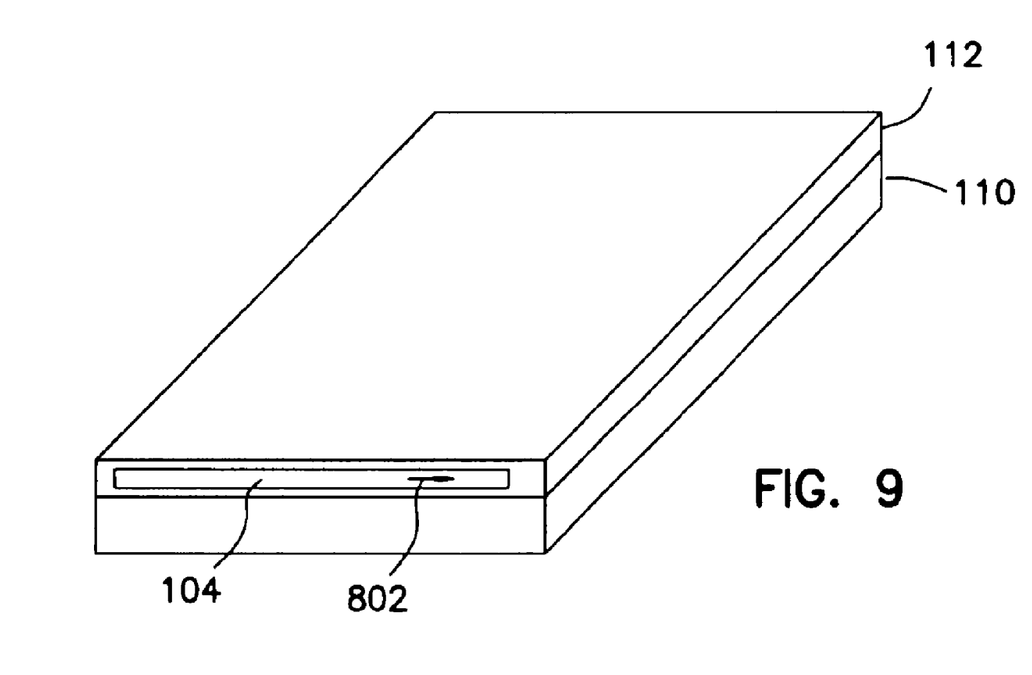
FIG. 9 is a side view of the apparatus of FIG. 1 when a secondary display device is in a stored position and the primary display device is in a closed position.

FIGS. 7–9 illustrate side views for various and different embodiments of the apparatus of FIG. 1 in an extended position, a stored position and a stored and closed position, respectively. In particular, FIG. 7 includes primary display device 102, computer 110, secondary display device 104 and housing 112, wherein secondary display device 104 is in an extended position. The components of FIG. 7 have been described in detail above in conjunction with FIGS. 1 and 2.

FIG. 8 illustrates an embodiment of the apparatus of FIG. 1 showing secondary display device 104 in a stored position. In particular, FIG. 8 includes primary display device 102, secondary display device 104, computer 110, housing 112 and pocket door latch 802. Secondary display device 104 includes pocket door latch 802 which maintains secondary display device 104 in the stored position when the secondary display device is not being used. In this position primary display device 102 still operates and displays for computer 110. In other words, primary display device 102 can operate independently of the secondary display devices. Moreover, pocket door latch 802 functions to allow secondary storage device 104 to be moved from a stored to an extended position (shown in FIG. 7). In particular, a computer user of the apparatus illustrated in FIG. 8 opens pocket door latch 802 to allow secondary display device 104 to be moved from the stored to the extended position. Additionally, embodiments of the apparatus shown in FIG. 8 can include a pocket door latch for each secondary display device stored in housing 112. Further, while door latch 802 is shown on secondary display device 104, it could also be implemented on housing 112.

FIG. 9 illustrates an embodiment of the apparatus of FIG. 1 in what is termed a stored and closed position. FIG. 9 includes computer 110, housing 112, primary display device 102, secondary display device 104 and pocket door latch 802. In this embodiment, housing 112 has been closed against computer 110 wherein the primary display device is not viewable. Moreover, FIG. 9 illustrates that the secondary display devices are in a stored position and thus not viewable. While multiple display devices have been described in conjunction with portable or laptop computers, it should be understood that multiple display devices may also be used with a desktop computer monitor without departing from the scope of the invention.

Previously, apparatus and system embodiments were described. In this section, method embodiments are described by references to a flowchart, shown in FIG. 10. In block 1002 as previously described in conjunction with the apparatus and system embodiments, at least one secondary display device is stored behind the housing for the primary display device, wherein the at least one secondary display device and primary display device are operatively coupled to a computer. In block 1004 as previously described in conjunction with the apparatus and system embodiments, at least one secondary display device is extended from the housing for the primary display device. In one such embodiment, at least one secondary display device is extended from the housing along tracks located in the housing. In another embodiment, at least one secondary display device is held in the extended position with a spring loaded switch.

Figure 10:
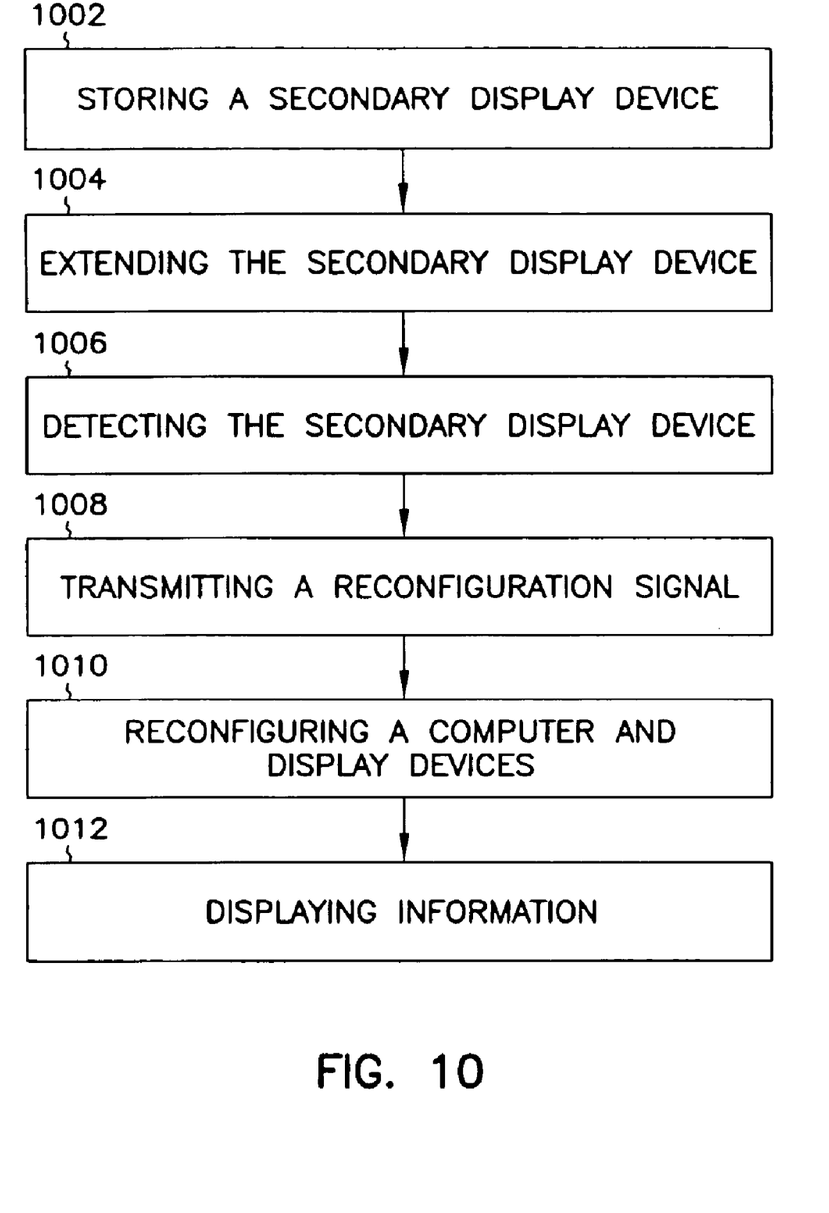
FIG. 10 is a flowchart of a method for multiple display devices according to one embodiment of the present invention.

In block 1006 as previously described in conjunction with the apparatus and system embodiments, detection occurs when at least one secondary display device is extended from the housing for the primary display device. In one embodiment, this detection is performed by spring loaded switches located in the housing for the primary display device. In block 1008 as previously described in conjunction with the apparatus and system embodiments, a reconfiguration signal is transmitted to a computer that is operatively coupled to the primary display device and at least one secondary display device. In particular, this transmission of a reconfiguration signal occurs when at least one secondary display device has been extended from the stored position. In one embodiment, a spring loaded switch is operatively and electrically coupled to computer 110 so as to allow the transmission of electrical signals between the two. In one such embodiment, the secondary display switch completes a connection to cause an electric signal to be transmitted back to a controller of computer 110 to force a reconfiguration of computer 110, both software and hardware.

In block 1010 as previously described in conjunction with the apparatus and system embodiments, the computer is reconfigured such that the computer displays information in a primary display device and at least one secondary display device. In one such embodiment, the computer performs an automatic configuration, while in an alternative embodiment, the computer provides choices to the user of the computer on the type of reconfiguration (e.g., single or multiple monitor support). In block 1012 as previously described in conjunction with the apparatus and system embodiments, information received from a computer operatively coupled to a primary display device and at least one secondary display device is displayed in a primary display device and at least one secondary display device.

Method and apparatus embodiments of the present invention comprise computer programs written for reconfiguration of the multiple display devices as shown in the above-described Figures. The computer programs run on a central processing unit of computer 110 out of main memory, and may be transferred to main memory from permanent storage via a disk drive when stored on removable media or via a network connection or modem connection when stored outside of the personal computer, or via other types of computer or machine readable medium from which it can be read and utilized. The computer programs comprise multiple modules or objects to perform the method embodiments of the present invention, or the functions of the modules in the apparatus embodiments of the present invention. The type of computer programming languages used to write the code may vary between procedural code type languages to object oriented languages. The files or objects need not have a one to one correspondence to the modules or method steps described depending on the desires of the programmer. Further, the method and apparatus may comprise combinations of software, hardware and firmware as is well known to those skilled in the art.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

I claim:

1. A display apparatus comprising:
a primary display device for a computer for displaying a primary set of information and a secondary set of information; and
at least one secondary display device for the computer, the at least one secondary display device being operatively coupled to the computer and stored in a housing adjacent to the primary display device, such that the at least one secondary display device can be extended from the housing and used to display the secondary set of information for the computer, wherein upon extension of the secondary display device, a viewing area in the primary display device for the primary set of information is increased.

2. The display apparatus of claim 1, wherein the at least one secondary display device is operatively coupled to the primary display device.

3. The display apparatus of claim 1, wherein the at least one secondary display device is held in an extended position with a spring loaded switch when the at least one secondary display device is extended from the housing.

4. The display apparatus of claim 3, wherein the spring loaded switch provides a conductive path for a transmission of a reconfiguration signal to the computer when at least one secondary display device is extended from the housing.

5. The display apparatus of claim 4, wherein the computer reconfigures the primary display device and the at least one secondary display device to provide single session support upon receiving the reconfiguration signal, independent of a restart of the computer.

6. The display apparatus of claim 1, wherein the at least one secondary display device is extended from a side of the housing.

7. The display apparatus of claim 1, wherein the at least one secondary display device is operatively coupled to the computer through a flat printed cable (FPC).

8. The display apparatus of claim 1, wherein the at least one secondary display device and the primary display device are operatively coupled to the computer through a single inverter board.

9. The display apparatus of claim 1, wherein the primary display device and the at least one secondary display device are each operatively coupled to the computer through a single inverter board using a single FPC.

10. The display apparatus of claim 1, wherein the primary display device is operatively coupled to the computer through a single inverter board using a first FPC and wherein the at least one secondary display device is operatively coupled the computer through the single inverter board using a second FPC.

11. The display apparatus of claim 1, wherein the at least one secondary display device includes a first secondary display device extended from a side of the housing and a second secondary display device extended from a top of the housing.

12. The display apparatus of claim 1, further comprising at least one hinge coupling the at least one secondary display device to the housing.

13. A system comprising:
a computer;
a primary display device operatively coupled to the computer for displaying a primary set of information and a secondary set of information; and
at least one secondary display device operatively coupled to the primary display device and stored in a housing behind the primary display device, such that the at least one secondary display device can be extended from the housing and used to display a secondary set of information for the computer automatically upon extension of the secondary display device to increase a viewing area in the primary display for the primary set of information.

14. The system of claim 13, wherein the at least one secondary display device is held in an extended position with a spring loaded switch when the at least one secondary display device is extended from the housing.

15. The system of claim 14, wherein the spring loaded switch provides a conductive path for a transmission of a reconfiguration signal to the computer when the at least one secondary display device is extended from the housing.

16. The system of claim 13, wherein the at least one secondary display device is extended from a side of the housing.

17. The system of claim 13, wherein the at least one secondary display device is extended from a top of the housing.

18. The system of claim 13, wherein the at least one secondary display device is operatively coupled to the computer through a flat printed cable (FPC) cable.

19. The system of claim 13, wherein the primary display device and the at least one secondary display device is operatively coupled to the computer through a single inverter board using a single FPC.

20. The system of claim 13, wherein the primary display device is operatively coupled to the computer through a single inverter board using a first FPC and wherein the at least one secondary display device is operatively coupled the computer through the single inverter board using a second FPC.

21. The system of claim 13, wherein the at least one secondary display device includes a first secondary display device extended from a side of the housing and a secondary display device extended from a top of the housing.

22. A system comprising:
a computer;
a primary display device operatively coupled to the computer;
at least one secondary display device operatively coupled to the primary display device and stored in a housing behind the primary display device, such that the at least one secondary display device can be extended from the housing and used to display primary and secondary information for the computer; and
a reconfiguration module located in the computer, comprising machine readable instruction for causing the computer to perform a method, wherein the reconfiguration module is initiated when the at least one secondary display device is extended from the housing, the method including;
displaying a reconfiguration screen on the primary display device, the reconfiguration screen including a number of reconfiguration options;
receiving one of the number of reconfiguration options based on a user input; and
reconfiguring the computer such that the computer displays the secondary information in the at least one secondary display device and increases a viewing area for primary information in the primary display device based on the one of the number of reconfiguration options.

23. A method for displaying, comprising:
extending at least one secondary display device from a housing, wherein the housing is located behind a primary display device; and displaying secondary sets of information at the at least one secondary display device and the primary display device that is received from a computer that is operatively coupled to the at least one secondary display device and the primary display device when the secondary display device is extended from the housing, such that a viewing area for a primary set of information is increased on the primary display device.

24. The method of claim 23, further comprising storing the at least one secondary display device behind the housing for the primary device.

25. The method of claim 23, further comprising transmitting a reconfiguration signal to the computer when the at least one secondary display device is extended.

26. The method of claim 23, further comprising reconfiguring the computer to display to both the at least one secondary display device and the primary device.

27. The method of claim 23, wherein extending the at least one secondary display device from the housing includes extending the at least one secondary display device from a side of the housing.

28. The method of claim 23, wherein displaying information received from the computer that is operatively coupled to the at least one secondary display device and the primary display device includes transmitting the information through a single inverter board using a single FPC to the primary display device and the at least secondary display device.

29. The method of claim 23, wherein extending the at least one secondary display device from the housing includes extending a first secondary display device from a side of the housing and extending a second secondary display device from a top of the housing.

30. A method for displaying, comprising:
 detecting when at least one secondary display device is extended from a housing, wherein the housing is located behind a primary display device;
 transmitting a reconfiguration signal to a computer operatively coupled to the at least one secondary display device and the primary display device; and
 reconfiguring the computer such that the computer sets of secondary application information in the at least one secondary display device and displays primary application information in the primary display device to increase a viewing area in the primary display device for the primary application information.

31. The method of claim 30, further comprising displaying a reconfiguration screen on the primary display device and wherein reconfiguring the computer is based on a user input received from the reconfiguration screen.

32. A method for displaying, comprising:
 storing at least one secondary display device in a housing located behind a primary display device;
 extending the at least one secondary display device from the housing;
 detecting when at least one secondary display device is extended from a housing;
 transmitting a reconfiguration signal to a computer when the at least one secondary display device is extended, the computer operatively coupled to the at least one secondary display device and the primary display device; and
 reconfiguring the computer such that the computer displays sets of secondary application information in the at least one secondary display device and displays primary application information in the primary display device to increase a viewing area in the primary display device for the primary application information.

33. A display apparatus comprising:
 a primary display device for a computer for displaying primary and secondary information from a session; and
 at least one secondary display device for the computer, the at least one secondary display device operatively coupled to the computer and stored in a housing adjacent to the primary display device, such that the at least one secondary display device can be extended from the housing and used to display the secondary information from the session upon extension of the secondary display device to increase a viewing area of the primary display device for the primary information.

34. A display apparatus comprising:
 a primary display device for a computer for displaying primary and secondary information from an application running on the computer, and
 at least one secondary display device for the computer, the at least one secondary display device operatively coupled to the computer and stored in a housing adjacent to the primary display device, such that the at least one secondary display device can be extended from the housing and used to display the secondary information from the application upon extension of the secondary display device to automatically increase a viewing area of the primary display device for the primary information.

35. The display apparatus of claim 34, wherein the secondary sets of information comprises tools for the application.

36. The display apparatus of claim 34, wherein the at least one secondary display device is held in an extended position with a spring loaded switch when the at least one secondary display device is extended from the housing.

37. The display apparatus of claim 36, wherein the spring loaded switch provides a conductive path for a transmission of a reconfiguration signal to the computer when the at least one secondary display device is extended from the housing.

38. The display apparatus of claim 37, wherein the computer reconfigures the primary display device and the at least one secondary display device to provide single session support upon receiving the reconfiguration signal, independent of a restart of the computer.

39. The display apparatus of claim 34, wherein the at least one secondary display device is extended from a side of the housing.

40. The display apparatus of claim 34, wherein the at least one secondary display device includes a first secondary display device extended from a side of the housing and a second secondary display device ex tended from a top of the housing.

41. A system comprising:
 a computer;
 a primary display device operatively coupled to the computer for displaying primary information and secondary information associated with an application running on the computer; and
 at least one secondary display device operatively coupled to the primary display device and stored in a housing behind the primary display device, such that the at least one secondary display device can be extended from the housing and used to display the secondary information associated with the application upon extension of the secondary display device to automatically increase a viewing area of the primary device for the primary information.

* * * * *